US007715307B2

(12) United States Patent
Walton et al.

(10) Patent No.: US 7,715,307 B2
(45) Date of Patent: May 11, 2010

(54) COMMUNICATION CONNECTION CONTROL SYSTEMS AND METHODS

(75) Inventors: Jason Walton, Ottawa (CA); Peter Duncan Roberts, Ottawa (CA)

(73) Assignee: Alcatel Lucent, Paris (FR)

( * ) Notice: Subject to any disclaimer, the term of this patent is extended or adjusted under 35 U.S.C. 154(b) by 1111 days.

(21) Appl. No.: 11/301,590

(22) Filed: Dec. 13, 2005

(65) Prior Publication Data

US 2007/0133394 A1    Jun. 14, 2007

(51) Int. Cl.
*H04L 1/16* (2006.01)
(52) U.S. Cl. .................................................... 370/216
(58) Field of Classification Search ......... 370/216–229, 370/241, 241.1, 244, 245, 252
See application file for complete search history.

(56) References Cited

U.S. PATENT DOCUMENTS

| | | | | |
|---|---|---|---|---|
| 5,495,471 | A * | 2/1996 | Chow et al. | 370/221 |
| 5,896,496 | A * | 4/1999 | Suzuki | 714/48 |
| 7,315,510 | B1 * | 1/2008 | Owens et al. | 370/218 |
| 2002/0064126 | A1 * | 5/2002 | Bhattal et al. | 370/217 |
| 2003/0112748 | A1 * | 6/2003 | Puppa et al. | 370/217 |
| 2003/0147346 | A1 * | 8/2003 | Kanakubo | 370/227 |
| 2004/0233909 | A1 * | 11/2004 | Allen et al. | 370/395.1 |

OTHER PUBLICATIONS

Capello, A., et al., "Non-Stop Forwarding Behaviour and Performance in High-End Routers for ISP's Backbone Networks," IEEE, XP-010868569, pp. 279-285, Oct. 2005.

Katz, D., et al., "Generic Application of BFD," IETF Standard-Working-Draft, Internet Engineering Task Force, IETF, XP-015045636, pp. 1-16, Jun. 2006.

Ash, Jerry, et al., "PNNI Routing Congestion Control," IEEE Communications Magazine, XP-011122557, pp. 154-160, Nov. 2004.

The ATM Forum Technical Committee, "PNNI Routing Resynchronization Control Version 1.0," XP-002437491, pp. 1-52, Jun. 2004.

Farrel, A., "Fault Tolerance for the Label Distribution Protocol (LDP)," IETF Standard, Internet Engineering Task Force, XP-015009262, pp. 1-52, Feb. 2003.

* cited by examiner

*Primary Examiner*—Hanh Nguyen
*Assistant Examiner*—Juvena Loo
(74) *Attorney, Agent, or Firm*—Eckert Seamans Cherin & Mellott, LLC (57) ABSTRACT

Communication connection control systems and methods are disclosed. If a control failure recovery function is to be enabled for a data communication connection established by a communication connection controller by communicating control information with a remote controller, an indication that the control failure recovery function is supported at the controller is included in the control information communicated with the remote controller. Each of the controller and the remote controller may support, for example, either or both of a local control information recovery function or a resynchronization function to reduce the amount of time that the data connection is interrupted during a temporary failure of one of the controllers.

18 Claims, 4 Drawing Sheets

| Connection Identifier 72 | Function Indicator 74 | Control Information 76 | Other Information 78 |

FIG. 4

COMMUNICATION CONNECTION CONTROL SYSTEMS AND METHODS

FIELD OF THE INVENTION

This invention relates generally to communications and, in particular, to control of data communication connections.

BACKGROUND

Communication protocols that use control plane signalling between network nodes to establish data plane connections, such as X.25, X.76, and Private Network-to-Network Interface (PNNI), generally provide procedures for releasing connections on detection of a protocol failure. If a particular node has a restart of its control plane, for example, then its neighbor node control plane will detect the restart by detecting a period of receiving no messages from the restarting control plane on a signalling link.

Existing protocols indicate that the procedures for such a NO_RESPONSE event are to release calls and thus disconnect the data plane connections associated with a restarting control plane. However, in many implementations, there is separation between the control and data planes. A failure of the control plane thus does not always imply that the data plane has also failed. Disconnecting a data plane connection in this case causes an unnecessary interruption in end user data flow. If a call that originates or terminates in a node affected by a control plane restart is torn down by a neighbor node, then the data path cannot re-establish until the control plane has fully restarted and the signalling links have returned to an 'up' state.

Some Internet Protocol (IP) switches support a procedure whereby "Hello" packets are continuously broadcast between neighbor switches. Each switch restarts a hold timer when it receives a "Hello" packet. Normally, if the hold timer expires, a switch assumes that its neighbor switch's control plane has failed and will remove the neighbor from its routing tables and stop forwarding packets to that neighbor. According to a modified restart procedure, a switch that detects a control plane restart at a neighbor switch will continue to route packets to the neighbor switch throughout the control plane outage. When the restarting neighbor switch's control plane resets and broadcasts another "Hello" packet, the switch will re-send routing information to the neighbor switch.

However, this IP restart procedure relies entirely on a restarting switch's neighbor switches to provide all required routing information to the restarting switch. This may be undesirable in that in some cases not all required information may be available at the neighbor switches, for instance.

In addition, existing techniques are generally provided on a per-interface basis, for all or no connections that use the same interface. These techniques therefore do not provide for connection-level selectivity for enabling such procedures.

Thus, there remains a need for improved techniques for handling controller failures such as control plane restarts.

SUMMARY OF THE INVENTION

Some embodiments of the invention allow data communication connections to be maintained during controller failures, such as a control plane restart at the source or destination of a connection.

A technique for addressing the problem of signalled data connections, which are established using control signalling, being dropped when a control plane restart occurs may thereby be provided. According to one embodiment, this is accomplished by indicating that data communication connections are to be created with a special control failure handling capability when they are originally established, provided each node in the path of the connection supports this capability. Once a failed control plane recovers from a failure, the affected node will restore all connections internally and then initiate a resynchronization procedure with its neighbors. This procedure returns data connections to normal status and clears any restored connections released by the neighbors during the control plane failure.

In this manner, a controller that is affected by a failure performs connection recovery operations itself, and does not rely entirely on neighbor nodes or their controllers to restore connections internally.

According to an aspect of the invention, there is provided a communication connection controller that includes a function determination module configured to determine whether a control failure recovery function is to be enabled for a data communication connection established by communicating control information with a remote controller, and a control failure recovery module, operatively coupled to the function determination module, configured to include in the control information communicated with the remote controller an indication that the control failure recovery function is supported at the controller where the control failure recovery function is to be enabled for a data communication connection.

The control failure recovery module may be configured to support the control failure recovery function by maintaining the data communication connection during a failure that affects the remote controller and providing to the remote controller control information associated with the data communication connection following correction of the failure.

In some embodiments, the function determination module is configured to determine whether the control failure recovery function is to be enabled by determining whether the control failure recovery function has been requested for the data communication connection.

The data communication connection may be one of a plurality of segments of a data communication connection. In this case, the function determination module may be configured to determine whether the control failure recovery function has been requested by determining whether control information received from a further remote controller for establishing a further segment of the data communication connection includes a control failure recovery function request, and to include the control failure recovery function request in the control information communicated with the remote controller where the control information received from the further remote controller includes a control failure recovery function request.

The failure recovery module may include as the indication in the control information communicated with at least one of the remote controller and the further remote controller an indication that it supports the function of maintaining the data connection where the control information received from the further remote controller includes a control failure recovery function request.

The function determination module may be configured to determine whether the control failure recovery function is to be enabled by determining whether the remote controller supports a function of maintaining the data communication connection during a failure that affects the controller. This determination may be made by determining whether control information received from the remote controller comprises a function indicator indicating that the remote controller is capable of performing the maintain function.

A communication device may include such a controller and a detector operatively coupled to the control failure recovery module. The detector is configured to detect a failure of the remote controller and correction of the failure, and the control failure recovery module is configured to maintain the data communication connection for a predetermined amount of time after detection of a failure by the detector, and to release the data communication connection unless correction of the failure is detected by the detector within the predetermined amount of time.

Where the data communication connection is one of a plurality of segments of a data communication connection between a source communication device and a destination communication device, the function determination module may determine whether the control failure recovery function is to be enabled for the segment of the data communication connection by determining whether the segment is connected to the source communication device or the destination communication device.

In some embodiments, the control failure recovery module is further configured to store control information associated with the data communication connection, and to retrieve the stored information following recovery of the controller from a failure, where the control failure recovery function is enabled for the data communication connection.

A communication system may include a plurality of communication devices. The plurality of communication devices may include respective controllers configured to communicate control information for establishing data communication connections between the plurality of communication devices. Each communication device of at least a subset of the plurality of communication devices may include a controller as described above. The controllers of the communication devices of the subset allow the control failure recovery function to be enabled on a per-connection basis for data communication connections between the communication devices of the subset for recovery from a failure that affects a controller of a communication device of the subset.

Another aspect of the invention provides a method that involves communicating control information between controllers associated with communication devices, the control information being used by the controllers to establish a data communication connection between the communication devices, determining whether a control failure recovery function is to be enabled for a data communication connection between communication devices, and including in the control information communicated between the communication devices associated with the data communication connection an indication of whether each of the associated communication devices supports the control failure recovery function for the data communication connection, where the control failure recovery function is to be enabled for the data communication connection.

Where the data communication connection includes respective segments connecting a plurality of communication devices, the operation of communicating control information may involve, for each communication device of the plurality of communication devices, determining whether the controller associated with the communication device supports one or more of a resynchronization function and a control information retrieval function, and including as the indication in the control information communicated between the controller associated with the communication device and another controller an indication of whether the controller associated with the communication device supports one or more of the resynchronization function and the control information retrieval function.

The control failure recovery function may involve maintaining a data communication connection between communication devices during a failure that affects a controller associated with one of the communication devices, and releasing the data communication connection where the failure is not corrected within a predetermined amount of time.

In some embodiments, the control failure recovery function involves maintaining a data communication connection between communication devices during a failure that affects a controller associated with one of the communication devices, receiving from the controller a request for control information, and providing control information to the controller responsive to the received request.

If the data communication connection is one of a plurality of segments of a data communication connection between a source communication device and a destination communication device, the operation of communicating control information may involve, for each communication device of a subset of communication devices including the source communication device, the destination communication device, and any communication devices connected to the source communication device or the destination communication device through a segment of the data communication connection, determining whether the controller associated with the communication device supports one or more of a resynchronization function and a control information retrieval function, and including as the indication in the control information communicated between the controller associated with the communication device and a controller associated with another communication device of the subset an indication of whether the controller associated with the communication device supports one or more of the resynchronization function and the control information retrieval function.

In some embodiments, the control failure recovery function involves storing, locally at a controller, control information associated with a data communication connection, and retrieving the locally stored control information following correction of a failure that affects the controller.

There is also provided a communication connection controller that includes a function determination module configured to determine whether a control failure recovery function is to be enabled for a data communication connection established by communicating control information with a remote controller, and a control failure recovery module, operatively coupled to the function determination module, configured to store control information associated with the data communication connection and to retrieve the stored information following correction of a failure that affects the controller where the control failure recovery function is to be enabled for the data communication connection.

The control failure recovery module may be further configured to request control information from the remote controller following correction of the failure, and to reconcile the retrieved control information with control information received from the remote controller responsive to the request.

In some embodiments, the remote controller is configured to detect the failure, to maintain the data communication connection for up to a predetermined time interval between detection of the failure and receipt of the control information request from the controller, and to provide control information to the controller responsive to the request.

The control failure recovery module may be further configured to include in control information communicated with the remote controller an indication that the control failure recovery function has been enabled for the data communication connection where the control failure recovery function is to be enabled for a data communication connection.

A related method according to another aspect of the invention involves communicating control information between controllers associated with communication devices, the control information being used by the controllers to establish a data communication connection between the communication devices, determining whether a control failure recovery function is to be enabled for the data communication connection, and where the control failure recovery function is to be enabled for the data communication connection, storing, locally at a controller, control information associated with the data communication connection, and retrieving the locally stored control information following correction of a failure that affects the controller.

A machine-readable medium storing a data structure is also provided. The data structure includes an identifier of a data communication connection established between communication devices by communicating control information between controllers associated with the communication devices, and an indication that a control failure recovery function for recovering from a failure that affects one or more of the controllers has been enabled for the data communication connection.

The data structure may also include control information associated with the data communication connection or a link to control information associated with the data communication connection.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
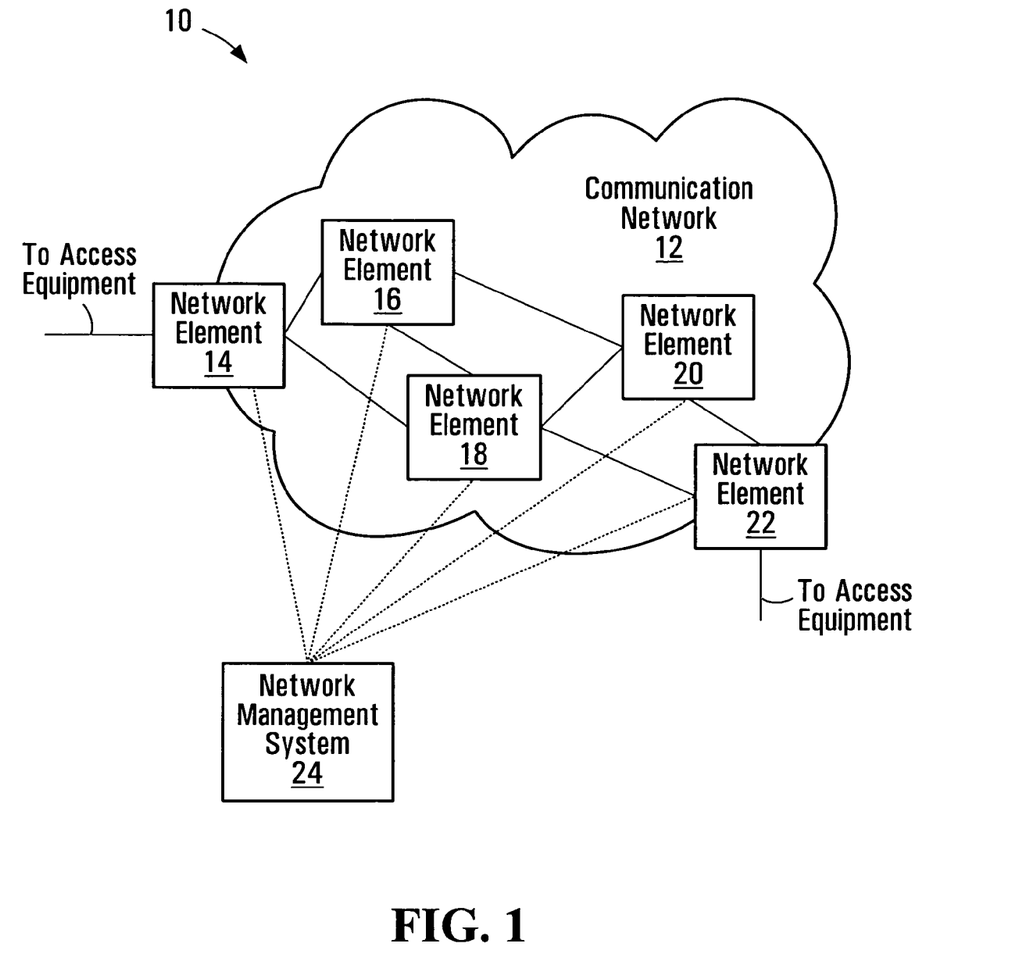
FIG. 1 is a block diagram of a communication system.

FIG. 1 is a block diagram of an example communication system 10 in which embodiments of the invention may be implemented. The communication system 10 includes a communication network 12 and a network management system (NMS) 24. The communication network 12 includes network elements 14, 16, 18, 20, 22 between which communication network connections through the network 12 may be established. The network elements in the communication network 12 include border or edge network elements 14, 22, which may be connected to access equipment such as end user devices, other communication networks, and/or other external equipment, and interconnected core network elements 16, 18, 20.

Other equipment which may be provided within a communication network or operate in conjunction with a communication network, such as end user equipment and other user, management, or control equipment, has not been explicitly shown in FIG. 1 to avoid congestion in the drawing. It should therefore be appreciated that the system of FIG. 1, as well as the contents of the other drawings, are intended solely for illustrative purposes. Embodiments of the present invention are in no way limited to any particular type of network, equipment, interconnections, or communications.

The network elements 14, 16, 18, 20, 22 may be switches, routers, or generally any communication devices through which data communication connections may be established. A data communication connection may be virtually any type of connection over which communication signals are exchanged. As those skilled in the art will appreciate, connections may include wired connections, wireless connections, or any combination thereof. Connections may be established, for example, for telephone calls and data communication sessions. The particular types of connections available in the communication network 12 may be dependent upon the types of the network elements 14, 16, 18, 20, 22, the protocols used in the network, the services offered by service providers using the network, the types of end user equipment for which the connections are established, for instance, and possibly other factors.

References to "data" connections have been used herein to distinguish connections that are used for transfer of communication traffic from those used to transfer control information. Data connections may be used to transfer any of various types of communication traffic, including voice, multimedia, etc. It should also be appreciated that communication traffic and control information may be transferred over separate, dedicated media or via different logical connections over the same shared physical media. The references herein to data and control connections should be interpreted accordingly.

In operation, the network elements 14, 16, 18, 20, 22 may generate, receive, and process control information such as control messages or commands to establish and/or release or tear down communication network connections. Any of several different mechanisms may be used for management of connections in the communication network 12. For example, Asynchronous Transfer Mode (ATM) Switched Permanent Virtual Connections (SPVCs) may be established under the control of the NMS 24. SPVCs are established across the network 12 using ATM signalling and routing (typically PNNI) from a source node to a destination node. In this case, for example, the NMS 24 may configure the source on the network element 14 and optionally the destination on the network element 22, and PNNI will be used to establish the connection between them.

This type of connection, with which those skilled in the art will be familiar, represents an illustrative example of a type of connection in conjunction with which embodiments of the invention may be implemented. It should be appreciated that the present invention is in no way limited to SPVCs. Other types of connection, which may or may not involve the NMS 24, are also contemplated. ATM network connections also include Permanent Virtual Connections (PVCs) and/or Switched Virtual Connections (SVCs), for example. In other embodiments, the connection control techniques disclosed herein are used in conjunction with non-ATM networks and connections, such as MPLS Label Switched Paths (LSPs) established using the Label Distribution Protocol (LDP) for control signalling.

In the system 10, a connection between the network elements 14, 22 may be established through the communication network 12 via different routes. These routes include the network elements 16, 20, the network element 18, the network elements 18, 20, or all three core network elements 16, 18, 20. One route for this example network connection is selected based on routing criteria, and the network connection is then established through the network elements in the selected route. Those skilled in the art will be familiar with many possible route selection and connection establishment techniques (e.g. PNNI).

Once a data communication connection has been established, it may remain operative to transfer data regardless of a subsequent control plane failure. In this situation, there may be no need to release a data connection simply because a control failure has occurred.

Although some IP switches may support data forwarding during a control plane failure, IP-based solutions rely entirely on neighbor nodes to send all required routing information to any failed nodes after those failed nodes recover from a failure. According to an aspect of the invention, however, a different methodology is used. When a control plane failure at one node is detected by a neighbor node, such as when an expected control message is not received from the node before a timer expires, the neighbor node will maintain selected connections, specifically those designated to be maintained during a control plane failure. Once the control plane failure is corrected, the affected node internally restores the connections, which have been similarly designated at the affected node, and then initiates a synchronization procedure with its neighbors so as to reconcile the restored connections with actual current connections.

As described in further detail below, the techniques disclosed herein may be selectively applied on a connection-by-connection basis, and even a hop-by-hop basis within a connection. Consider the example of two data connections between the network element 14 and the network element 22. One connection could be established with improved connection control procedures enabled, while the other connection could use conventional procedures to release data connections upon control plane failure. The determination of a connection control technique could instead be made for each hop or connection segment. This would allow communication devices which support different connection control techniques to be deployed in the same communication system, for instance.

These and other features of embodiments of the invention will be described in detail with reference to FIG. 2, which is a block diagram of communication device. A network element is one example of the communication device 30, although other implementations are also contemplated.

The communication device 30 includes one or more control/data transceivers 32, a controller 34 operatively coupled to the transceiver(s) 32, a detector 36 operatively coupled to the controller 34 and to the transceiver(s) 32, a memory 38 operatively coupled to the controller 34, and timers 40, 42 operatively coupled to the detector 36. Within the controller 34, a function determination module 35 is operatively coupled to the transceiver(s) 32, and a failure recovery module 37 is operatively coupled to the transceiver(s) 32, to the function determination module 35, to the detector 36, and to the memory 38.

Figure 2:
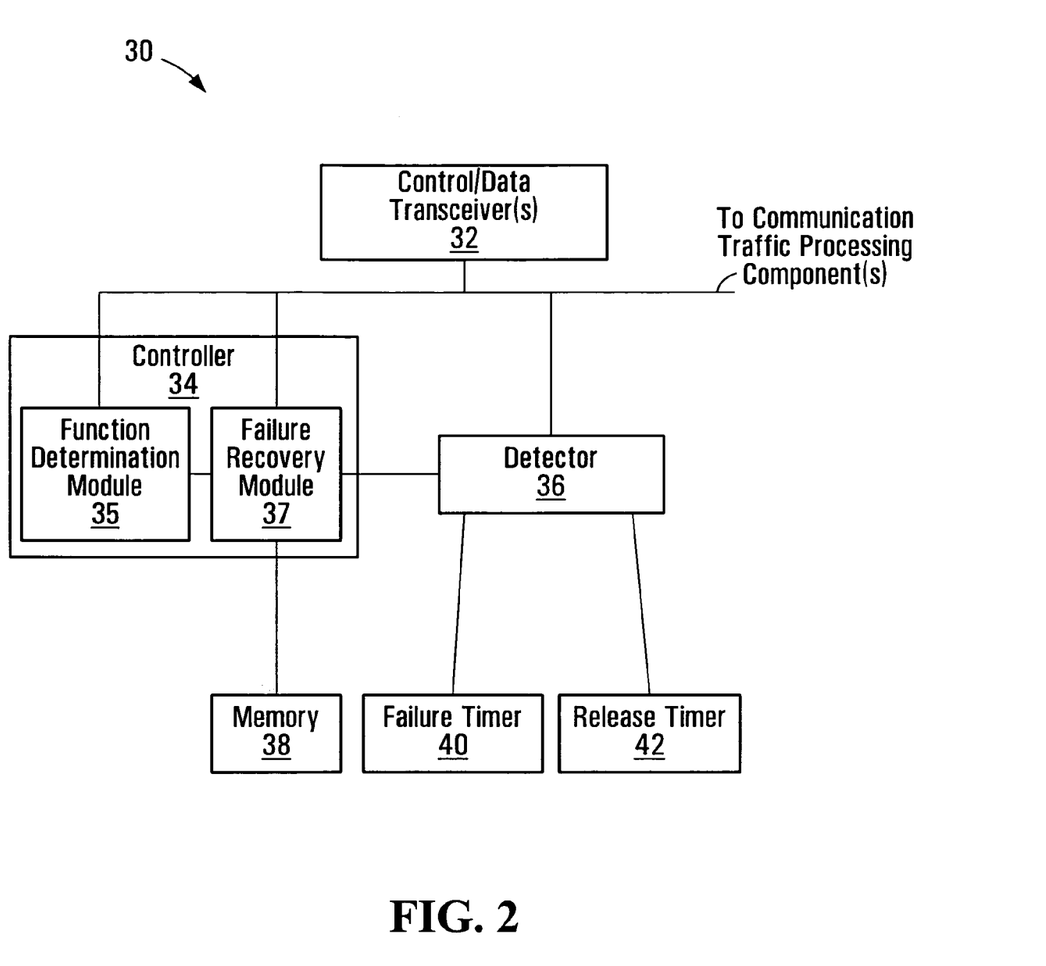
FIG. 2 is a block diagram of a communication device.

A communication device may include additional components that have not been shown in FIG. 2. Communication traffic processing components, for example, have been referenced in FIG. 2 but not explicitly shown in order to avoid congestion in the drawing. It should also be appreciated that the specific division of functions represented by the components shown in FIG. 2 is intended solely for the purposes of illustration and not to limit the scope of the invention. Other embodiments of the invention may include further, fewer, or additional components interconnected in a similar or different manner.

The components of the device 30 may be operatively coupled to each other through physical connections such as conductive traces on a substrate where the components are provided on an electronic circuit card for communication equipment and/or backplane conductors where the components are distributed between multiple cards in the same equipment. At least a control transceiver 32, the controller 34, the detector 36, the memory 38, and the timers 40, 42 may be provided on a control card, whereas a data transceiver 32 and communication traffic processing components are provided on one or more line cards, for instance.

Logical interconnections are also contemplated, where any of the components of the device 30 are implemented using software for execution by one or more processing elements. In this case, components may access information stored in common storage locations in the memory 38, for example, and may thus be considered to be coupled to each other through a logical connection.

The control/data transceiver(s) 32 may include a single transceiver that is used to communicate control information and data or separate dedicated transceivers. In the latter case, the controller 34 is operatively coupled to at least the control transceiver and the communication traffic processing component(s) would be operatively coupled to at least the data transceiver.

Various examples of control and data formats and protocols, as well as transceivers that support these formats and protocols, will be apparent to those skilled in the art. Embodiments of the invention are not restricted to any specific formats or protocols.

The modules 35 and 37 of the controller 34, the detector 36, the timers 40, 42, and to some extent the transceiver(s) 32, may be implemented using hardware, software, firmware, or any combination thereof. Those skilled in the art will be familiar with many devices that may be used in implementing these components, such as microprocessors, microcontrollers, Application Specific Integrated Circuits (ASICs), Programmable Logic Devices (PLDs), and/or Field Programmable Gate Arrays (FPGAs), for example.

The memory 38, however, would generally be provided as a hardware component, and may include one or more memory devices. Solid state memory devices are common in communication devices, although the memory 38 may also or instead include memory devices for use with movable or even removable storage media.

In view of the many possible implementations of the functional components shown in FIG. 2, these components are described herein primarily in terms of their operation. Based on the operational descriptions, a skilled person would be enabled to implement embodiments of the invention in any of various ways.

The controller 34 is operable to exchange control information with a controller of another communication device to establish a data connection between the communication device 30 and the other communication device. This process can perhaps best be described with reference also to FIG. 1 and considering the example of a data connection to be progressed along a series of signalling links between the network element 14 and the network element 22 through the core network elements 16, 18, 20 using PNNI.

A data connection may be established in this example by including in control information an indication of whether each network element 14, 16, 18, 20, 22 supports one or more functions that allow a data connection to be maintained in the event of a control plane failure. A data connection control failure recovery function, involving control plane failure handling in accordance with embodiments of the invention, is referred to hereinbelow primarily as Signalling Plane Graceful Restart (SPGR). However, the use of "SPGR" is intended for convenience only. The invention may be used to handle other failures than signalling/control plane restarts.

The controller 34, specifically the control failure recovery module 37, in a preceding network element may include an "SPGR Capable" indicator in a Generic Application Transport (GAT) information element (IE) in a PNNI Setup message, for example, with pass-along disabled. This indicator informs the controller of a succeeding network element that the preceding network element supports SPGR. SPGR may involve one or both of a resynchronization function and a control information retrieval function, which are described in further detail below.

When the succeeding node receives this indicator, its function determination module 35 determines that a control failure recovery function is to be enabled for the data connection. The failure recovery module 37 designates the connection as a connection that is to be maintained, and not released or torn down, during a failure affecting the controller of the preceding network element, as described in further detail below. The module 37 of the succeeding network element may store an identifier of the data connection and an "SPGR Supported" or analogous indicator in the memory 38, for example. In other embodiments, the function determination module 35 may be operatively coupled to the memory 38 and designate the connection as "SPGR Supported". As previously noted, any division of functions shown in the drawings and described herein are illustrative and do not limit the scope of the invention.

Each of the network elements 16, 18, 20 may proceed in a similar manner to insert an "SPGR Capable" indicator in a GAT IE of the Setup message as the Setup message is transferred from controller to controller to establish each segment of the data connection.

Capability indicators may be transferred in the opposite direction in a GAT IE of a Connect message that is communicated between the controllers. This allows the controller of each preceding network element to determine the SPGR capabilities of its succeeding network element, and to designate its local side of the data connection segment, if appropriate, as "SPGR Supported".

The above example assumes that all of the network elements 14, 16, 18, 20, 22 support SPGR. However, this might not necessarily be the case in all implementations. Network elements in the same communication network may have different capabilities. Supposing that the network element 14 supports SPGR, the "SPGR Capable" indicator is added to control information that is communicated to the controller 34 of the network element 16. Depending on its own capabilities, the controller 34 of the network element 16 may or may not designate the connection segment with the network element 14 as "SPGR Supported". If the network element 16 does not support SPGR, for instance, it would not mark the connection as "SPGR Supported", and also would not insert the "SPGR Capable" indicator into the Connect message that it would return to the network element 14 after establishment of the data connection has been completed.

The other network elements 18, 20, 22 and their controllers may operate similarly to determine whether data connection segments should be designated "SPGR Supported" or handled according to conventional control and release techniques.

Where an IE is used for a capability indicator such as the "SPGR Capable" indicator described above, pass-along is preferably disabled for that IE. A capability indicator is an indicator that is local to each signalling link and data connection or segment, and therefore should not be passed through a network element that does not support SPGR. Otherwise, an SPGR supporting network element could incorrectly determine that its neighbor network element supports SPGR, and then the SPGR capable network element will incorrectly designate an associated data connection as "SPGR Supported". If the controller of the non-supporting network element subsequently fails, then the SPGR supporting network element maintains the data connection when it should not, since the non-supporting network element is not able to internally rebuild connections as described below.

If end-to-end SPGR is to be provided, then each network element that supports SPGR generates its own "SPGR Capable" indicator.

To allow for selective enabling of the SPGR capability on an individual per-connection basis, another indicator, illustratively an "SPGR Requested" indicator in a GAT IE, is included in Setup messages to inform each SPGR supporting network element that SPGR should be enabled. Having this IE marked as pass-along ensures that connection segments between SPGR supporting network elements along the path of a data connection will be designated "SPGR Supported". The controller 34 of each SPGR supporting network element determines whether control signalling, a Setup or Connect message in this example, includes the "SPGR Requested" indicator, passes that GAT IE to another network element, and inserts the "SPGR Capable" indicator into another GAT IE of the Setup or Connect message.

Any of several mechanisms may be implemented to allow the controller 34 to determine whether it supports SPGR. This determination may be implicit in the actual operation of the controller 34, in that a non-supporting controller may be unable to process the "SPGR Requested" indicator beyond simply passing the indicator along to another controller. In this case, the non-supporting controller removes any GAT IE including an "SPGR Capable" indicator, for which pass-along is disabled, and does not insert its own the "SPGR Capable" indicator. In other embodiments, the controller 34 makes an explicit determination as to SPGR support, by accessing configuration information for instance.

SPGR may involve a resynchronization function, which effectively delays release of a connection at a communication device after a failure affecting a controller of another device is detected, and/or a control information retrieval function. In some embodiments, these functions are provided by each SPGR supporting controller, although it is also possible that a controller need not necessarily support both functions.

The resynchronization function may be supported in any or all communication devices through which a data connection is established, but is performed by a controller a communication device when a failure affects a different controller associated with another communication device. The detector 36, as described in further detail below, is operable to detect such a failure that affects a remote controller. If the control failure recovery module 37 of the controller 34 supports the resynchronization function, and the data connection to a communication device associated with the remote controller is to be maintained, that is, the data connection is designated as "SPGR Supported" in one embodiment, the control failure recovery module 37 maintains the data connection and also provides data connection control information to the remote controller. In this manner, the controller 34 participates in a procedure for resynchronizing the failed remote controller.

According to an aspect of the invention, the control failure recovery module of a failed controller itself retrieves locally stored control information when the failure is corrected. The additional information provided by the controller 34 is used by the remote controller for reconciling the control information that it recovers locally. For example, it is possible that a call in progress over a data connection before the failure was ended by a user during the failure. Whereas the controller 34 that maintained the data connection during the failure would be aware that the data connection was released when the call ended, control information associated with that call would have been stored by the remote controller and subsequently retrieved by the remote controller when it recovered from the failure. In this case, the remote controller reconciles the retrieved control information with the control information it receives from the controller 34 by removing information associated with the released connection from its database.

In another embodiment, an affected controller might not implement the local control information retrieval function, thereby reducing the additional storage space associated with locally storing control information for data connections. Suppose, for example, that failure recovery is to be provided for a data connection between a source node and its first hop neighbor. With the retrieval function supported at the source node and the resynchronization function supported at the first hop neighbor, the data connection is unaffected by a temporary controller failure at the source node. In the absence of any failure recovery function support, a failure of the source node controller would result in a data connection outage for the entire duration of the failure. If, however, the source node does not support the retrieval function but does support some form of receive-side operation for the resynchronization function, then source node might still indicate "SPGR Capable" in a Setup message.

Assuming that the neighbor supports the resynchronization function, the data connection would then be maintained by the first hop neighbor through the source node controller failure. Once the source node controller is restored, the source node initiates the resynchronization function with its neighbor. Since the existing connection was not reprogrammed, the neighbor will first tear down the existing "stale" data connection as part of the resynchronization function, and then the source node may attempt to re-establish the original data connection. The result is a relatively brief data interruption for the data connection. The duration of the interruption in this case will be between the long outage where no failure recovery is provided, and no outage at all with full support for the failure recovery function.

The resynchronization function thus involves maintaining a data connection and providing information to a failed controller after the failure affecting that controller has been corrected.

As noted above, the resynchronization function is performed when a remote controller, not the local controller 34, is affected by a failure. The detector 36 may detect such a failure in any of various ways. The failure timer 40 represents one example of an implementation that provides for time-based failure detection.

According to one embodiment, the failure timer 40 is a resettable timer that is reset by the detector 36 each time an expected control message is received from a remote controller of a communication device with which a data connection has been established. Multiple failure timers may be used if the communication device 30 has multiple data connections to other communication devices. If the failure timer 40 expires, then the detector 36 has not received the expected control message within a predetermined time, and a failure affecting the remote controller is detected. Other failure detection mechanisms are also possible.

A detected failure may or may not be immediately reported to the control failure recovery module 37. For a non-SPGR data connection, the detector 36 informs the control failure recovery module 37 or possibly a different controller module of a detected remote controller failure, and the data connection is released. The detector 36 could instead be configured to delay reporting a detected remote controller failure to the controller 34 in the case of an SPGR connection, since such a connection is to be maintained during the failure.

Another possible approach would be to have the detector 36 report all detected remote controller failures to the controller 34, and the control failure recovery module 37 or another controller module then determines the appropriate action. A non-SPGR data connection is released upon detection of a failure affecting the remote controller, whereas an SPGR connection is maintained.

A failure that affects a remote controller may be a failure of the controller itself, such as a software- or hardware-initiated reset of the controller or a power loss, or a condition associated with another component through which the remote controller communicates with the controller 34. The control transceiver at the remote communication device or a physical control signalling medium between the communication device 30 and the remote communication device may have failed, for example. References herein to failures should be interpreted accordingly.

It is possible that a failure affecting a controller, such as a break in a physical control signalling medium, will persist for a relatively long time. Whereas a controller restart might complete within an acceptable amount of time, it may be undesirable to maintain data connections during longer controller failures, where repair or replacement of a damaged cable is required for instance. The release timer 42 may thus be set to provide a time period that is not substantially longer than an expected controller restart time, or possibly some other acceptable time delay, before a maintained connection is released and possibly other failure handling procedures are initiated.

Therefore, in some embodiments, the control failure recovery module 37 is configured to maintain a data connection for a predetermined amount of time after detection of a failure by the detector 36. The amount of time that a data connection is maintained is set by the release timer 42, which is started upon detection of a failure by the detector 36. Like the failure timer 40, the release timer 42 is a resettable timer, but is reset if control signalling is subsequently received from the remote controller after a detected failure is corrected. This subsequent control signalling may be in the form of a request for control information, as described in further detail below. The release timer 42 thus provides a predetermined amount of time for correction of a failure. Unless the failure is corrected within that time, the release timer 42 expires, and the data connection is released by the control failure recovery module 37.

Although the release timer 42 is shown in FIG. 2 as being operatively coupled to the detector 36, this timer could also or instead be operatively coupled to the control failure recovery module 37, depending upon how the control failure recovery module 37 and the detector 36 have been configured. As noted above, the detector 36 might delay reporting a detected failure to the control failure recovery module 37, in which case the detector 36 might report the detected failure to the control failure recovery module 37 upon expiry of the release timer 42. The control failure recovery module 37 in this case maintains a data connection for a predetermined amount of time, but would not be aware of the remote controller failure. If detected failures are reported to the control failure recovery module 37 as they are detected, then the control failure recovery module 37 could interact directly with the release timer 42 to determine when a maintained data connection should be released. The release timer 42 might also be operatively coupled to the detector 36 in such an implementation to allow the detector 36 to reset the timer when the failure is corrected.

From the foregoing, it will be apparent that failure detection functions such as timer monitoring and resetting could be performed by the controller 34, the detector 36, or distributed between those components. The division of these functions between the separate controller 34 and detector 36 as shown in FIG. 2 is solely for illustrative purposes.

Connection control techniques according to embodiments of the invention may also involve a control information retrieval function at a communication device whose local controller 34 is affected by a failure. The operations associated with the resynchronization function described above would be performed by a controller of a communication device whose neighbor is affected by a controller failure, whereas the control information retrieval function allows a controller to internally rebuild its pre-failure data connections from locally stored information without first obtaining that information from its neighbor controller(s).

The recovery function is enabled by configuring the control failure recovery module 37 to store control information associated with data connections that are to be maintained during controller failures. For any data connections marked as "SPGR Supported", for example, the control failure recovery module 37 might store in the memory 38 a call reference or other connection identifier and control information associated with the data connection, such as the port, Virtual Path Identifier (VPI) and Virtual Circuit Identifier (VCI) used to reach each neighbor communication device to which it is connected through the data connection or segments thereof. It should be appreciated that the above call reference, port, VPI, and VCI information is intended solely for illustrative purposes. Other similar or different information may be stored. Different protocols may use different control information for data connections, for example.

In the event of a failure of the controller 34, the stored control information can be retrieved locally from the memory 38 when the failure is corrected. The memory 38 therefore includes a storage device or storage locations that would be non-volatile with respect to a failure of the controller 34. Once a failure is corrected, the controller 34 can retrieve the stored control information to internally rebuild any SPGR data connections, and begin a reconciliation procedure. This procedure involves requesting control information from neighbor controllers, comparing the retrieved control information and control information received in response to the request, and performing any necessary updates.

The amount and particular types of information stored by a controller for its own use following a failure need not necessarily be identical to that transferred between controllers during connection establishment or resynchronization. Local internal cross-connect information, for example, represents one example of control information that could be stored and later retrieved by a controller, but not transferred between controllers or available to a neighbor controller in another communication device. This type of information could therefore be locally retrieved by a controller as part of the recovery function, but would not appear in control information received by the controller from a neighbor controller.

The overall connection control mechanism according to an embodiment of the invention may thus involve a resynchronization function at a non-affected communication device and a recovery function at an affected communication device. When a controller experiences a failure, which may be a reset for instance, the controller at each neighbor communication device detects the failure through its failure timer. For data connections on which SPGR is not supported, the normal connection clearing procedures may be performed by the controller of the non-affected device. For SPGR data connections, each neighbor device controller starts a release timer and releases those data connections if the release timer expires before the neighbor device receives an indication that the failure has been corrected. This indication is provided as part of the affected controller's recovery function.

After a failure condition has been corrected, such as when an affected controller has restarted, the affected controller retrieves previously stored information for all SPGR connections from a local memory. For each of the SPGR connections, the controller may rebuild connection control, a local signalling link, and connection information, for example, internally to thereby restore the connections without generating any external signalling messages.

Once an SPGR connection is restored locally by the affected controller, the controller performs a synchronization function for the associated signalling link with a neighbor device controller. This may entail sending a resync indication on a signalling link, which causes the neighbor device controller to send a status enquiry message for each current data connection associated with the signalling link. At this point, the neighbor device controller stops its release timer for the data connection. Existing status release procedures may be used by the affected controller to release any data connections for which either the affected communication device or a neighbor communication device do not have a current record, such as calls that were released elsewhere in a communication network during the failure.

It should be apparent from the foregoing that different controllers and communication devices may support SPGR to different degrees. Although it is expected that, in most implementations, controllers will either fully support or not support SPGR, the resynchronization function and the recovery function may be supported independently.

For example, with reference again to FIG. 1, consider a data connection between the network elements 14, 22 through the three core network elements 16, 18, 20, and a failure affecting the controller of the network element 16. In some types of network, it may be faster for the network element 14 to proceed with establishing an alternate route to the network element 22 through the network element 18 rather than delaying this action until the release timer at the network element 14 expires. However, since access equipment coupled to the network element 14 is reachable only through that network element, alternate routing would not overcome a failure affecting the controller of the network element 14. One possible approach in this situation would be to enable SPGR in one "direction", by enabling or providing support for the recovery function at the network element 14 and the resynchronization function at the network element 16. More generally, at least the recovery function could be supported at the border or edge network elements 14, 22 and at least the resynchronization function could be supported at the core network elements 16, 18, 20.

A data connection control failure recovery function request and/or capability indicator could be adapted to provide for this type of selective enabling. An "SPGR Requested" indicator might have different values to indicate whether a controller should enable the recovery function, the resynchronization function, or both. Other indicators such as the "SPGR Capable" indicator and/or the "SPGR Supported" indicator could be similarly adapted to provide an indication of a level of SPGR capability or support.

One-way SPGR, as described above, represents a special case of segment- or hop-specific SPGR. SPGR could therefore be enabled end-to-end to cover an entire data connection, on a segment-by-segment basis to cover specific segments, such as a first hop from a source node and/or a last hop to a destination node for which fewer alternate routes might be available in a communication network, and/or in a specific "direction" on one or more segments.

For source/destination-specific SPGR, special handling of the "SPGR Request" and "SPGR Capable" indicators may be enabled. The "SPGR Request" indicator might have respective values for requesting source/destination SPGR as opposed to end-to-end SPGR. An SPGR supporting controller, upon receiving a request for source/destination SPGR, might then add an "SPGR Capable" indicator to a Setup or Connect message only if it is the source node controller, the destination node controller, or associated with a neighbor node of the source node or the destination node.

Figure 3:
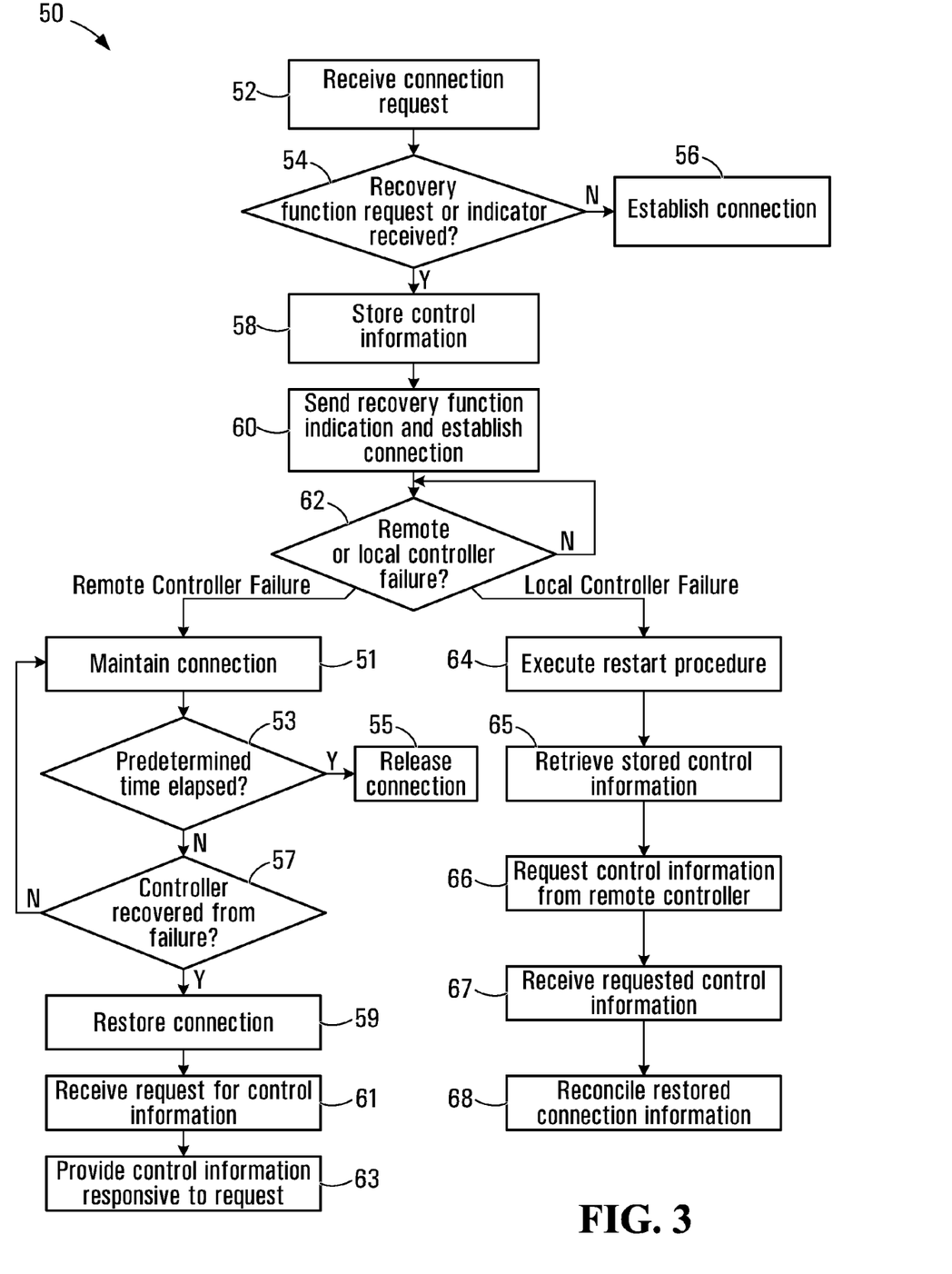
FIG. 3 is a flow diagram illustrating a method.
Figure 4:
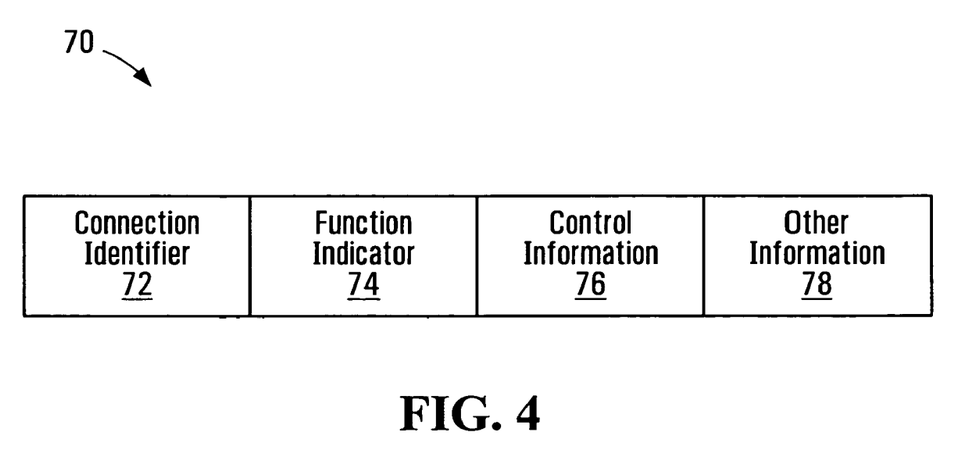
FIG. 4 is a block diagram illustrating a data structure.

Although described above primarily in the context of a communication device, aspects of the invention may be implemented in other forms. FIG. 3 is a flow diagram illustrating a method, and FIG. 4 is a block diagram illustrating a data structure, for example.

Referring first to FIG. 3, the method 50 begins at 52 with an operation of receiving a connection request or other control information that initiates establishment of a data connection. In the above example of PNNI, a connection request may be in the form of a Setup message.

At 54, a determination is made as to whether a control failure recovery function is to be enabled for the requested connection, to maintain the connection in the event of a failure of a controller. In the example shown in FIG. 3, this determination may be made on the basis of whether or not an "SPGR Requested" or "SPGR Capable" indicator is received from a remote controller, and possibly a level of SPGR that is to be enabled, including either or both of the resynchronization function and the recovery function described above.

If the control failure recovery function is not to be enabled for the requested connection, then the connection is established at 56 by communicating control information between communication device controllers.

Where at least the control information retrieval function is to be enabled, control information associated with the controller is stored at 58, and the connection is established at 60. The resynchronization function may also involve storing control information, although information is stored for different purposes for these functions. For the retrieval function, information is stored for local retrieval and use to rebuild data connections internally, whereas for the resynchronization function, information is stored for later transfer to a remote controller.

The operations at 56 and 60 have been similarly labelled in FIG. 3, but may involve different operations for non-SPGR connections established at 56 and SPGR connections established at 60. As described above, establishment of an SPGR connection may entail generation and transfer of "SPGR Capable" indicators for instance. This is shown at 60 in the form of sending a recovery function indication when establishing the connection.

When a controller failure occurs at 62, the nature of the subsequent operations is dependent upon whether the failure affects a local controller or a remote controller, and from which perspective the subsequent operations are being considered.

In the case of a remote controller failure that is detected at 62 by a local controller, an SPGR connection is maintained for a predetermined time, as shown at 51 and 53, or until the remote controller recovers from the failure at 57. Assuming that the remote controller eventually recovers from the failure at 57 before an SPGR connection is released at 55, control for that connection is restored at 59, and control information for the connection is reconciled. At a non-affected controller, which would be the local controller in the case of a remote controller failure, this may involve receiving a request for control information from the affected remote controller at 61, and sending control information to the affected remote controller at 63 in response to the request.

From the point of view of an affected controller, which is the case of a local controller failure in FIG. 3, failure recovery may involve completion of a restart procedure at 64. SPGR connections are then rebuilt internally by retrieving previously stored control information at 65, as described above. Control information for the connection is also requested from the remote controller at 66 and is received from the remote controller at 67 in response to the request. The affected local controller then reconciles the retrieved control information and control information received from its neighbor controller(s), at 68.

Other embodiments of the invention may include fewer, further, or different operations performed in a similar or different order than explicitly shown in FIG. 3. For example, the storing operation at 58 may be performed after the connection is established at 60. Further variations, including different possible ways of performing the operations shown in FIG. 3 and/or additional operations which may be performed in some embodiments, may be or become apparent to those skilled in the art. Some of these variations have been described above from a device perspective.

With reference now to FIG. 4, the data structure 70 includes data fields for storing a connection identifier 72, a function indicator 74, control information 76, and other information 78.

The connection identifier 72, which may be a call reference for instance, identifies a data connection, and the function indicator 74 provides an indication that a control failure recovery function has been enabled for the data connection. In one embodiment described above, the indicator 74 is an "SPGR Supported" indicator.

If the retrieval function is enabled for the connection, then control information may also be stored at 76. The data field 76 may store a pointer or other link to the actual control information instead of the control information itself.

As shown at 78, the data structure may also include other information. It should be appreciated that further variations of the data structure 70 are contemplated. Other embodiments of the invention may include further, fewer, or different data fields arranged in a similar or different order. For instance, a controller may store records for SPGR connections in an SPGR table or other dedicated memory structure or location. In this case, the function indicator 74 is moreso an implied indicator, in that the existence of a data record for a connection in the SPGR table indicates that the data connection is an SPGR connection.

Embodiments of the invention thus provide a mechanism whereby data connections or portions thereof, such as source and destination SPVCs, may be kept up during a control plane outage or other controller failure. This feature can be particularly useful for certain types of connections such as SPVCs. SPVCs are generally preferred over and easier to maintain than PVCs. However, unlike PVCs, SPVCs are prone to data outages caused by control plane failures. In the manner described above, SPVC data outages can be avoided for recoverable control plane failures.

What has been described is merely illustrative of the application of principles of embodiments of the invention. Other arrangements and methods can be implemented by those skilled in the art without departing from the scope of the present invention.

For example, a communication system may include communication devices having different SPGR capabilities. Implementation of an embodiment of the present invention thus does not preclude other forms of connection control. Where only a subset of communication devices in a communication network support SPGR, data connections between devices of the subset may have SPGR enabled, even though other connections or connection segments might not.

It should also be noted that SPGR can be deployed in conjunction with a data plane monitoring capability to allow for the override of SPGR support and a release of data connections if the data plane fails. Well known procedures for detecting port or Operations, Administration, and Maintenance (OAM) outages may be suitable for this type of monitoring.

In addition, although described primarily in the context of methods and systems, other implementations of the invention are also contemplated, as instructions stored on a machine-readable medium for example.

We claim:

1. A communication connection controller comprising:
   a function determination module configured to determine whether a control failure recovery function comprising one or more of a resynchronization function and a control information retrieval function is to be enabled for a segment of a data communication connection that is to be established between a source communication device and a destination communication device, the segment being established between a local communication device comprising the controller and a remote communication device comprising a remote controller by communicating control information between the controller and the remote controller, the data communication connection comprising a plurality of segments including the segment; and
   a control failure recovery module, operatively coupled to the function determination module, configured to include in the control information communicated with the remote controller to establish the data communication connection an indication that the control failure recovery function is supported at the controller,
   the function determination module being configured to determine whether the control failure recovery function is to be enabled by determining whether one or more of: a request to enable the control failure recovery function for the data communication connection, an indication that the remote controller supports the control failure recovery function, and an indication that a further remote controller of a further remote communication device supports the control failure recovery function for a further data communication connection segment between the local communication device and the further remote communication device, is received at the local communication device,
   the control failure recovery module being configured to include the indication in the control information where the control failure recovery function is to be enabled.

2. The controller of claim 1, wherein the control failure recovery module is configured to support the resynchronization function by maintaining the data communication connection segment during a failure that affects the remote controller and providing to the remote controller control information associated with the data communication connection segment following correction of the failure.

3. The controller of claim 1,
   wherein the function determination module is configured to determine whether a request to enable the control failure recovery function is received by determining whether control information received from the further remote controller for establishing the further segment of the data communication connection includes a control failure recovery function request.

4. The controller of claim 1, wherein the function determination module is configured to determine whether the control failure recovery function is to be enabled by determining, where the indication that the remote controller supports the control failure recovery function is received at the local communication device, whether the remote controller supports a function of maintaining the data communication connection during a failure that the resynchronization function.

5. The controller of claim 3, wherein the control failure recovery module is further configured to include as the indication in at least one of the control information communicated with the remote controller to establish the one of the plurality of segments and the control information communicated with the further remote controller for establishing the further segment an indication that the control failure recovery module supports the resynchronization function where the control information received from the further remote controller includes a control failure recovery function request.

6. A communication device comprising:
   a communication connection controller, the communication connection controller comprising:
   a function determination module configured to determine whether a control failure recovery function comprising one or more of a resynchronization function and a control information retrieval function is to be enabled for a segment of a data communication connection that is to be established between a source communication device and a destination communication device, the segment being established between a local communication device comprising the controller and a remote communication device comprising a remote controller by communicating control information between the controller and the remote controller, the data communication connection comprising a plurality of segments including the segment; and
   a control failure recovery module, operatively coupled to the function determination module, configured to include in the control information communicated with the remote controller to establish the data communication connection an indication that the control failure recovery function is supported at the controller,
   the function determination module being configured to determine whether the control failure recovery function is to be enabled by determining whether one or more of: request to enable the control failure recovery function for the data communication connection, an indication that the remote controller supports the control failure recovery function, and an indication that a further remote controller of a further remote communication device supports the control failure recovery function for a further data communication connection segment between the local communication device and the further remote communication device, is received at the local communication device,
   the control failure recovery module being configured to include the indication in the control information where the control failure recovery function is to be enabled,
   the communication device further comprising:
   a detector operatively coupled to the control failure recovery module and configured to detect a failure of the remote controller and correction of the failure, wherein the control failure recovery module is configured to support the resynchronization function by maintaining the data communication connection segment for a predetermined amount of time after detection of a failure by the detector, and releasing the data communication connection segment unless correction of the failure is detected by the detector within the predetermined amount of time.

7. The controller of claim 1, wherein the control failure recovery module is configured to support the control information retrieval function by storing control information associated with the data communication connection segment, and retrieving the stored control information following recovery of the controller from a failure.

8. A communication system comprising:
a plurality of communication devices, each communication device of at least a subset of the plurality of communication devices comprising a communication connection controller, the communication connection controller comprising:
a function determination module configured to determine whether a control failure recovery function comprising one or more of a resynchronization function and a control information retrieval function is to be enabled for a segment of a data communication connection that is to be established between a source communication device and a destination communication device, the segment being established between a local communication device comprising the controller and a remote communication device comprising a remote controller by communicating control information between the controller and the remote controller, the data communication connection comprising a plurality of segments including the segment; and
a control failure recovery module, operatively coupled to the function determination module, configured to include in the control information communicated with the remote controller to establish the data communication connection an indication that the control failure recovery function is supported at the controller,
the function determination module being configured to determine whether the control failure recovery function is to be enabled by determining whether one or more of: request to enable the control failure recovery function for the data communication connection, an indication that the remote controller supports the control failure recovery function, and an indication that a further remote controller of a further remote communication device supports the control failure recovery function for a further data communication connection segment between the local communication device and the further remote communication device, is received at the local communication device,
the control failure recovery module being configured to include the indication in the control information where the control failure recovery function is to be enabled,
wherein the control failure recovery module is configured to support the control information retrieval function by storing control information associated with the data communication connection segment, and retrieving the stored control information following recovery of the controller from a failure,
the controllers of the communication devices of the subset allowing the control failure recovery function to be enabled on a per-segment basis for data communication connection segments between the communication devices of the subset for recovery from a failure that affects a controller of a communication device of the subset.

9. A method comprising:
communicating control information between respective controllers associated with first and second communication devices, the control information being used by the controllers to establish a segment of a data communication connection between a source communication device and a destination communication device, the segment being established between the first and second communication devices, the data communication connection comprising a plurality of segments including the segment;
determining whether a control failure recovery function comprising one or more of a resynchronization function and a control information retrieval function is to be enabled for the data communication connection segment between the first and second communication devices, by determining whether one or more of: a request to enable the control failure recovery function for the data communication connection is received at the first communication device or the second communication device, an indication that the first communication device supports the control failure recovery function is received at the second communication device, an indication that the second communication device supports the control failure recovery function is received at the first communication device, and an indication that a further controller of a further communication device supports the control failure recovery function for a further data communication connection segment between the further communication device and one of the first communication device and the second communication device is received at the one of the first communication device and the second communication device; and
including in the control information communicated between the controllers to establish the data communication connection segment an indication of whether each of the first and second communication devices supports the control failure recovery function for the data communication connection segment, where the control failure recovery function is to be enabled for the data communication connection segment.

10. The method of claim 9, wherein the resynchronization function comprises:
maintaining the data communication connection segment during a failure that affects the controller associated with one of the first and second communication devices; and
releasing the data communication connection segment where the failure is not corrected within a predetermined amount of time.

11. The method of claim 9, wherein the resynchronization function comprises:
maintaining the data communication connection segment during a failure that affects a controller associated with one of the first and second communication devices;
receiving from the controller a request for control information; and
providing control information to the controller responsive to the received request.

12. The method of claim 9, wherein communicating control information comprises:
for each communication device of a subset of communication devices comprising the source communication device, the destination communication device, and any communication devices connected to the source communication device or the destination communication device through a segment of the data communication connection:

determining whether the controller associated with the communication device supports one or more of the resynchronization function and the control information retrieval function; and including as the indication in the control information that is communicated between the controller associated with the communication device and a controller associated with another communication device of the subset to establish the segment an indication of whether the controller associated with the communication device supports one or more of the resynchronization function and the control information retrieval function.

13. The method of claim 9, wherein the control information retrieval function comprises:

storing, locally at a controller, control information associated with the data communication connection segment; and retrieving the locally stored control information following correction of a failure that affects the controller.

14. The controller of claim 1, wherein the control failure recovery module is configured to perform the control information retrieval function by storing control information associated with the data communication connection segment and retrieving the stored control information following correction of a failure that affects the controller where the indication that the remote controller supports the control failure recovery function is received at the local communication device and indicates that the remote controller supports at least the resynchronization function.

15. The controller of claim 14, wherein the control failure recovery module is further configured to request control information from the remote controller following correction of the failure, and to reconcile the retrieved control information with control information received from the remote controller responsive to the request.

16. The controller of claim 15, wherein the remote controller is configured to support the resynchronization function by detecting the failure, maintaining the data communication connection for up to a predetermined time interval between detection of the failure and receipt of the control information request from the controller, and providing control information to the controller responsive to the request.

17. The controller of claim 14, wherein the control failure recovery module is further configured to include in control information communicated with the remote controller an indication that the control failure recovery function has been enabled for the data communication connection segment where the indication that the remote controller supports the control failure recovery function is received at the local communication device and indicates that the remote controller supports at least the resynchronization function.

18. The method of claim 9, further comprising:

where the control failure recovery function is to be enabled for the data communication connection segment:

storing, locally at a controller, control information associated with the data communication connection segment; and retrieving the locally stored control information following correction of a failure that affects the controller.

* * * * *